(12) United States Patent
Ochida (10) Patent No.: US 11,225,256 B2
(45) Date of Patent: Jan. 18, 2022

(54) VEHICLE CONTROL SYSTEM AND CONTROL METHOD OF VEHICLE

(71) Applicant: HONDA MOTOR CO., LTD., Tokyo (JP)

(72) Inventor: Jun Ochida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 16/558,423

(22) Filed: Sep. 3, 2019

(65) Prior Publication Data

US 2020/0079378 A1    Mar. 12, 2020

(30) Foreign Application Priority Data

Sep. 11, 2018    (JP) .............................. JP2018-169910

(51) Int. Cl.
| | |
|---|---|
| *B60W 30/18* | (2012.01) |
| *B60W 30/09* | (2012.01) |
| *B60W 30/12* | (2020.01) |
| *B60W 50/08* | (2020.01) |

(Continued)

(52) U.S. Cl.
CPC ...... *B60W 30/18163* (2013.01); *B60W 30/09* (2013.01); *B60W 30/12* (2013.01); *B60W 40/04* (2013.01); *B60W 50/082* (2013.01); *G06K 9/00791* (2013.01); *B60W 2420/42* (2013.01);

(Continued)

(58) Field of Classification Search
CPC ........... B60W 30/18163; B60W 30/09; B60W 30/12; B60W 40/04; B60W 50/082; B60W 2554/00; B60W 2420/42; B60W 2420/52; B60W 60/0018; B60W 60/00182; B60W 60/00184; B60W 60/00186; B60W 60/00188; G06K 9/00791; G06K 9/00798; G05D 1/0088
See application file for complete search history.

(56) References Cited

U.S. PATENT DOCUMENTS

| | | | |
|---|---|---|---|
| 9,623,869 B2 * | 4/2017 | Matsuno | ............. B60W 30/095 |
| 9,779,312 B2 * | 10/2017 | Sakagami | ........... G06F 16/5866 |
| 9,827,970 B2 * | 11/2017 | Lavoie | .................. B60W 10/18 |

(Continued)

FOREIGN PATENT DOCUMENTS

| CN | 201901172 U | 7/2011 |
|---|---|---|
| CN | 106061796 A | 10/2016 |

(Continued)

OTHER PUBLICATIONS

Chinese Office Action for Chinese Patent Application No. 201910826891.9 dated Sep. 3, 2021 (partially translated).

*Primary Examiner* — Angelina Shudy
(74) *Attorney, Agent, or Firm* — Thomas | Horstemeyer, LLP (57) ABSTRACT

A vehicle control system provided with a first detection unit and a second detection unit, which are configured to acquire peripheral information of a self-vehicle, comprises: a control unit that performs traveling control of the self-vehicle using the peripheral information, wherein when switching from a first traveling state using peripheral information detected by the first detection unit to a second traveling state using peripheral information detected by the second detection unit is performed, the control unit suppresses a control amount based on the peripheral information of the self-vehicle.

7 Claims, 7 Drawing Sheets

(51) Int. Cl.
*G06K 9/00* (2006.01)
*B60W 40/04* (2006.01)

(52) U.S. Cl.
CPC ..... *B60W 2420/52* (2013.01); *B60W 2554/00* (2020.02)

(56) References Cited

U.S. PATENT DOCUMENTS

| | | | |
|---|---|---|---|
| 9,829,888 B2 | 11/2017 | Reiff et al. | |
| 9,840,253 B1* | 12/2017 | Prasad | G05D 1/0246 |
| 9,975,572 B2 | 5/2018 | Sasaki et al. | |
| 10,048,691 B2 | 8/2018 | Reiff et al. | |
| 10,106,161 B2 | 10/2018 | Oyama | |
| 10,761,532 B2* | 9/2020 | Nakamura | G05D 1/0088 |
| 10,994,744 B2* | 5/2021 | Kanoh | B60W 50/14 |
| 11,021,165 B2* | 6/2021 | Noguchi | B60W 50/08 |
| 11,052,910 B2* | 7/2021 | Honda | B60W 40/064 |
| 2016/0272203 A1* | 9/2016 | Otake | B60W 50/14 |
| 2016/0332660 A1* | 11/2016 | Sasaki | B62D 6/002 |
| 2017/0139417 A1 | 5/2017 | Reiff et al. | |
| 2017/0267237 A1 | 9/2017 | Oyama | |
| 2017/0270798 A1* | 9/2017 | Ushiba | G08G 1/161 |
| 2018/0024560 A1 | 1/2018 | Reiff et al. | |
| 2018/0039270 A1* | 2/2018 | Satake | G05D 1/0246 |
| 2018/0086373 A1* | 3/2018 | Tamura | B60W 40/06 |
| 2018/0088572 A1* | 3/2018 | Uchida | B60W 10/18 |
| 2018/0181135 A1* | 6/2018 | Urano | B60W 60/0011 |
| 2018/0186405 A1 | 7/2018 | Nakahara | |
| 2018/0237006 A1* | 8/2018 | Ishii | B60W 50/0225 |
| 2018/0273053 A1* | 9/2018 | Ruemelin | B60K 35/00 |
| 2019/0071098 A1* | 3/2019 | Asakura | G06K 9/00798 |
| 2019/0263425 A1* | 8/2019 | Kanoh | B60W 50/082 |
| 2019/0291728 A1* | 9/2019 | Shalev-Shwartz | B60W 60/00272 |
| 2019/0369635 A1* | 12/2019 | Kobayashi | B60W 60/0059 |
| 2020/0079394 A1* | 3/2020 | Masuda | B60R 21/00 |
| 2020/0082648 A1* | 3/2020 | Cui | G06F 11/3013 |
| 2020/0231125 A1* | 7/2020 | Wakamiya | B60S 1/0848 |
| 2020/0282983 A1* | 9/2020 | Ito | B60W 30/0956 |
| 2020/0298887 A1* | 9/2020 | Mukai | B60W 60/0027 |
| 2020/0339151 A1* | 10/2020 | Batts | B60W 60/00186 |
| 2020/0391757 A1* | 12/2020 | Kim | B60W 60/00186 |
| 2021/0001886 A1* | 1/2021 | Jia | B60W 60/0015 |
| 2021/0065473 A1* | 3/2021 | Diehl | G01S 13/931 |

FOREIGN PATENT DOCUMENTS

| | | |
|---|---|---|
| CN | 107103272 A | 8/2017 |
| CN | 107200012 A | 9/2017 |
| CN | 110203199 A | 9/2019 |
| JP | 2003-040127 A | 2/2003 |
| JP | 2017-013560 A | 1/2017 |

\* cited by examiner

VEHICLE CONTROL SYSTEM AND CONTROL METHOD OF VEHICLE

CROSS-REFERENCE TO RELATED APPLICATION(S)

This application claims priority to and the benefit of Japanese Patent Application No. 2018-169910 filed on Sep. 11, 2018, the entire disclosure of which is incorporated herein by reference.

BACKGROUND OF THE INVENTION

Field of the Invention

The present invention relates to a vehicle control system and a control method of a vehicle.

Description of the Related Art

Concerning driving support control of a vehicle, a detection means (a sensor, a camera, or the like) is provided in the vehicle to acquire information on the periphery. An example of the information on the periphery is the position of a white line on a road. For example, Japanese Patent Laid-Open No. 2017-013560 describes detecting a white line by a camera, performing abnormality determination based on variations in the detected white line, and inhibiting control of steering in a case of an abnormality.

One vehicle is sometimes provided with a plurality of detection means. For example, cameras are installed on the left and right sides in the front portion of a vehicle to expand the detection region or make the detection function redundant. In this case, since the installation positions of the cameras in the vehicle are different, a shift occurs in the detection result. For this reason, if control is performed using the detection result of one camera, and switching to the other camera occurs meanwhile, control according to a variation at the time of switching is needed.

SUMMARY OF THE INVENTION

The present invention stabilizes the behavior of a vehicle at the time of switching of a camera.

According to one aspect of the present invention, there is provided a vehicle control system provided with a first detection unit and a second detection unit, which are configured to acquire peripheral information of a self-vehicle, comprising: a control unit configured to perform traveling control of the self-vehicle using the peripheral information, wherein when switching from a first traveling state using peripheral information detected by the first detection unit to a second traveling state using peripheral information detected by the second detection unit is performed, the control unit suppresses a control amount based on the peripheral information of the self-vehicle.

According to another aspect of the present invention, there is provided a control method of a vehicle provided with a first detection unit and a second detection unit, which are configured to acquire peripheral information of a self-vehicle, comprising: performing traveling control by suppressing a control amount based on the peripheral information of the self-vehicle when switching from a first traveling state using peripheral information detected by the first detection unit to a second traveling state using peripheral information detected by the second detection unit is performed.

According to the present invention, it is possible to stabilize the behavior of a vehicle at the time of switching of a camera.

Further features of the present invention will become apparent from the following description of exemplary embodiments (with reference to the attached drawings).

DESCRIPTION OF THE EMBODIMENTS

Hereinafter, embodiments will be described in detail with reference to the accompanying drawings. It should be noted that the following embodiments are not intended to limit the scope of the appended claims, and that not all the combinations of features described in the embodiments are necessarily essential to the solving means of the present invention. Two or more of a plurality of features described in the embodiments may arbitrarily be combined. In addition, the same reference numerals denote the same or similar parts, and a repetitive description thereof will be omitted.

First Embodiment

Figure 1:
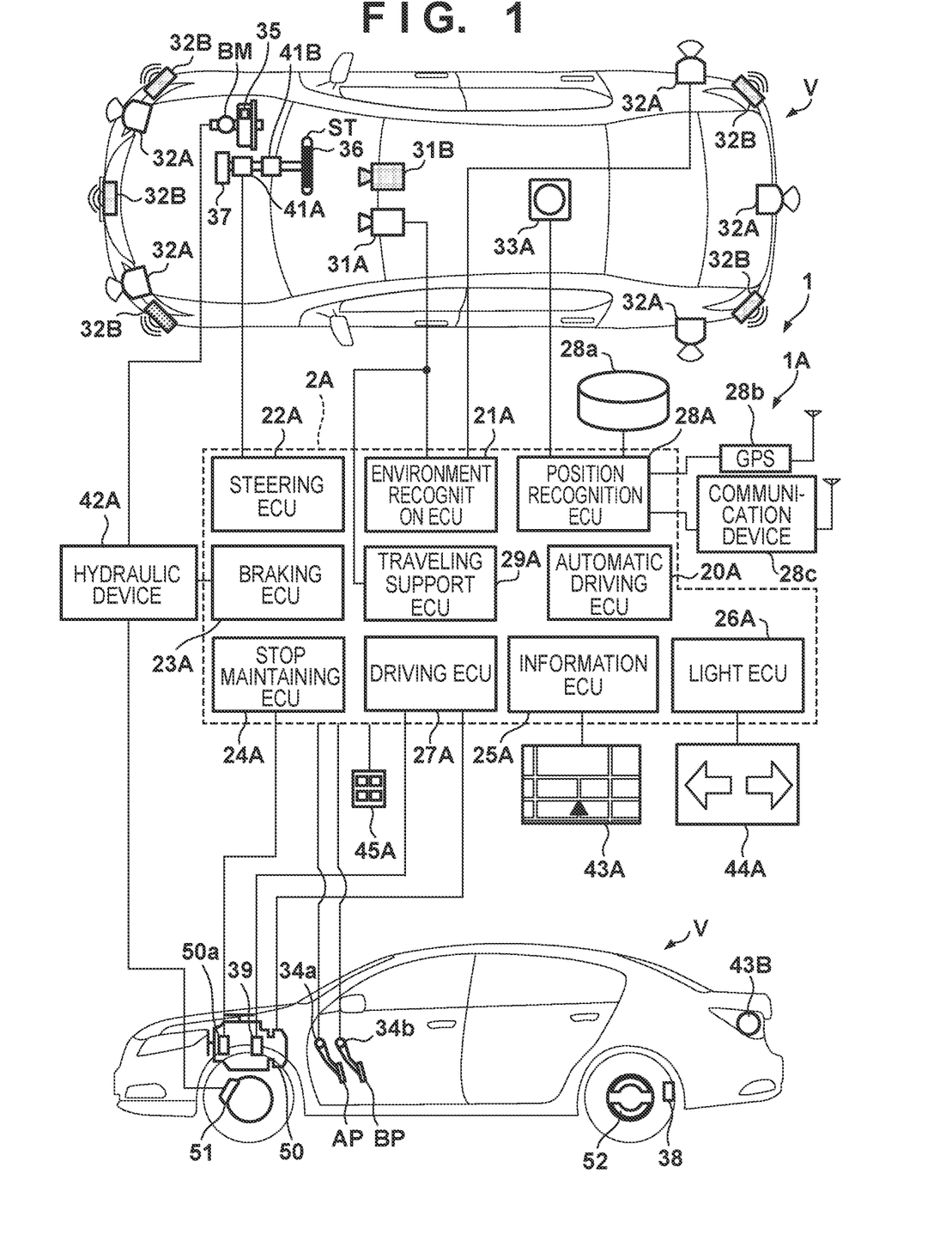
FIG. 1 is a block diagram of a vehicle control system according to an embodiment.
Figure 2:
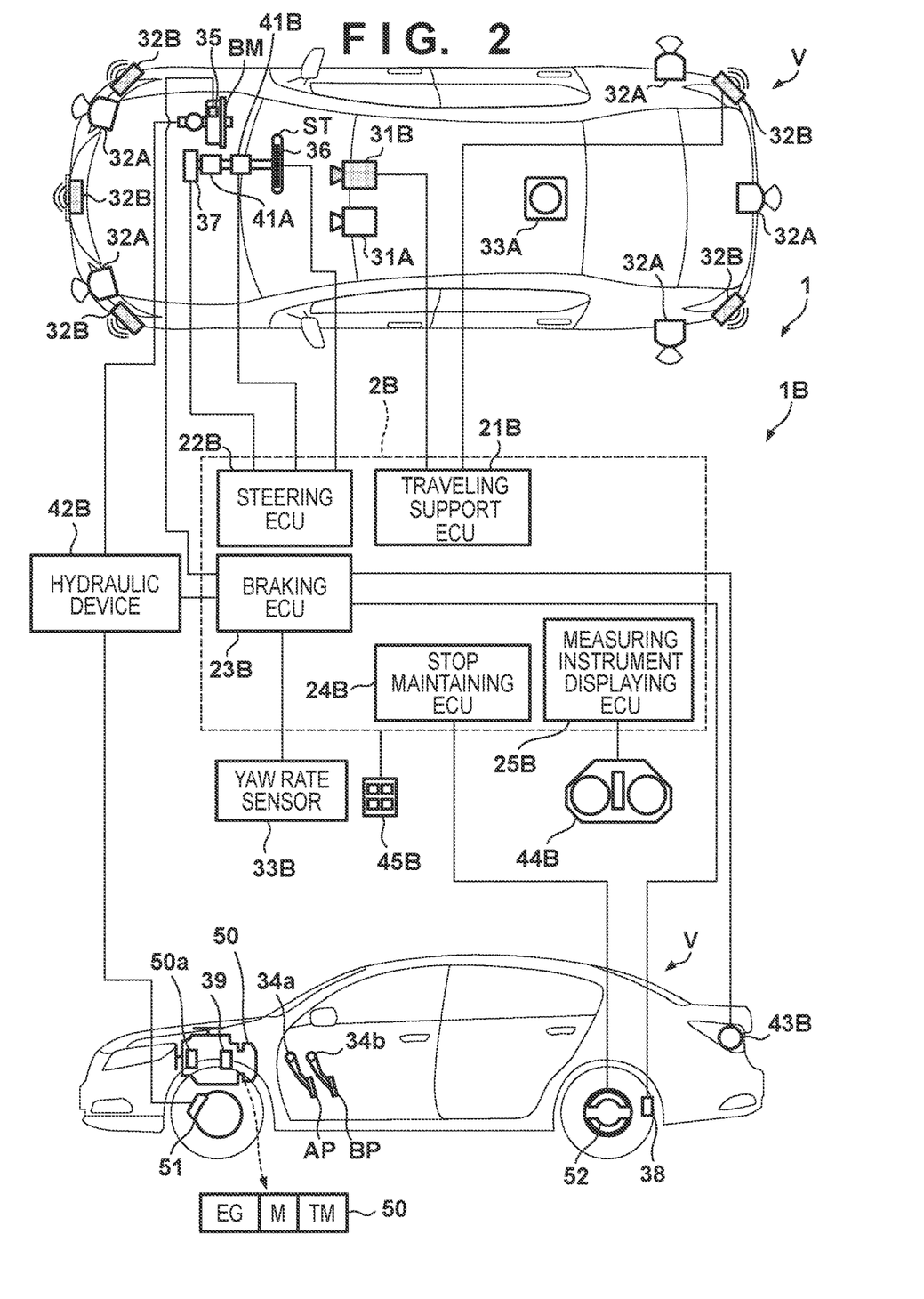
FIG. 2 is a block diagram of the vehicle control system according to the embodiment.
Figure 3:
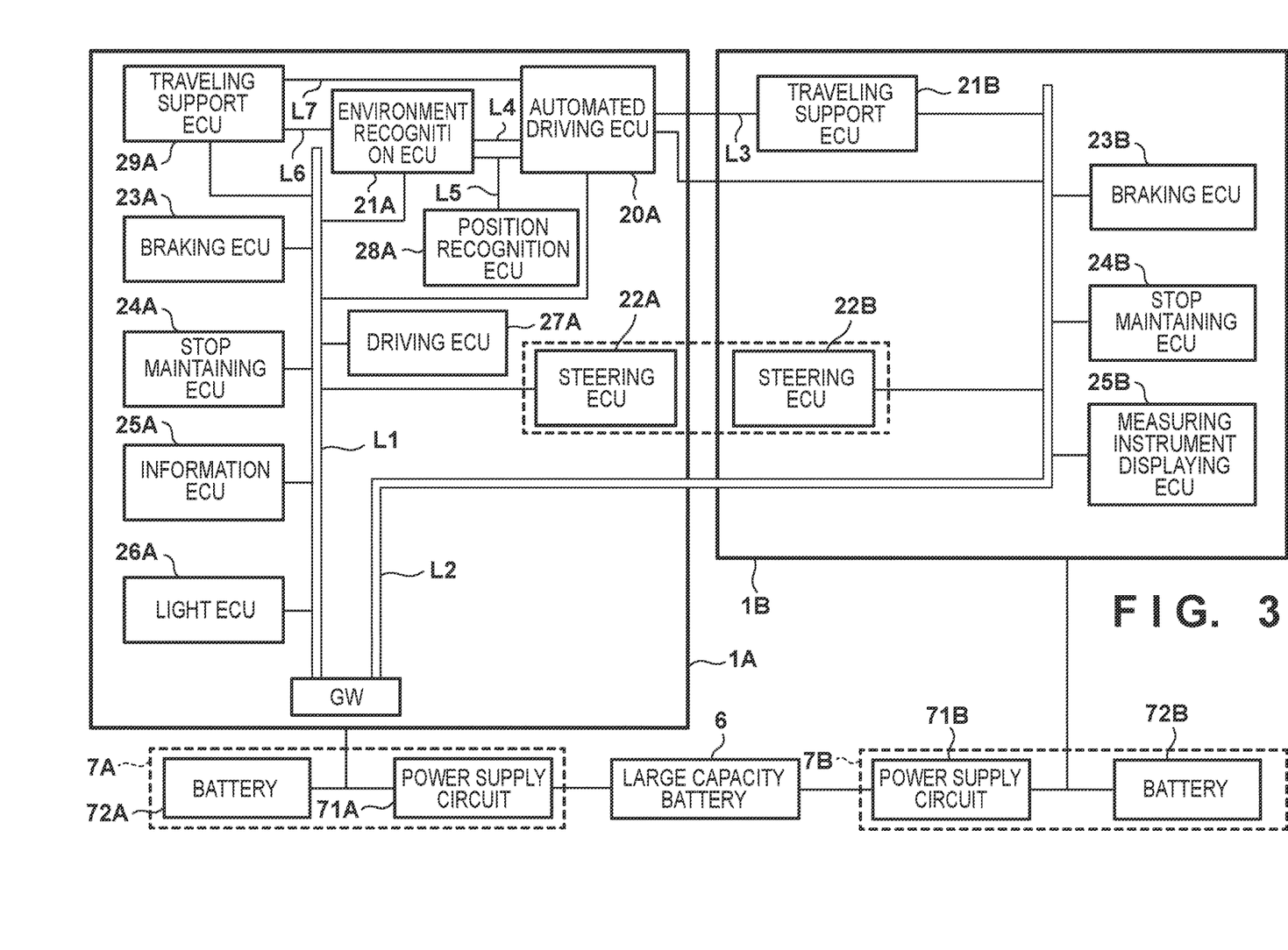
FIG. 3 is a block diagram of the vehicle control system according to the embodiment.

FIGS. 1 to 3 are block diagrams of a vehicle control system 1 according to an embodiment of the present invention. The vehicle control system 1 controls a vehicle V. In each of FIGS. 1 and 2, an outline of the vehicle V is shown in a plan view and a side view. As an example, the vehicle V is a sedan-type four-wheeled vehicle. The vehicle control system 1 includes a control apparatus 1A and a control apparatus 1B. FIG. 1 is a block diagram showing the control apparatus 1A, and FIG. 2 is a block diagram showing the control apparatus 1B. FIG. 3 mainly shows the arrangement of communication lines between the control apparatus 1A and the control apparatus 1B and power supplies.

The control apparatus 1A and the control apparatus 1B make some functions implemented by the vehicle V multiplexed or redundant. This can improve the reliability of the system. The control apparatus 1A performs, for example, not only automated driving control and normal operation control in manual driving but also traveling support control concerning risk avoidance and the like. The control apparatus 1B mainly performs traveling support control concerning risk avoidance and the like. Traveling support will sometimes be referred to as driving support. The control apparatus 1A and the control apparatus 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking).

<Control Apparatus 1A>

The arrangement of the control apparatus 1A will be described with reference to FIG. 1. The control apparatus 1A includes an ECU group (control unit group) 2A. The ECU group 2A includes a plurality of ECUs 20A to 29A. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 29A are given. For example, the ECU 20A is denoted by "automated driving ECU".

The ECU 20A executes control associated with automated driving as traveling control of the vehicle V. In automated driving, at least one of driving (acceleration of the vehicle V by the power plant 50, and the like), steering, and braking of the vehicle V is automatically performed independently of the driving operation of the driver. In this embodiment, driving, steering, and braking are automatically performed.

The ECU 21A is an environment recognition unit configured to recognize the traveling environment of the vehicle V based on the detection results of detection units 31A and 32A that detect the peripheral situation of the vehicle V. The ECU 21A generates target data (to be described later) as peripheral environment information.

In this embodiment, the detection unit 31A is an image capturing device (to be sometimes referred to as the camera 31A hereinafter) configured to detect an object around the vehicle V by image capturing. The camera 31A is attached to the windshield inside the vehicle cabin at the roof front of the vehicle V to capture the front side of the vehicle V. When images captured by the camera 31A are analyzed, the contour of a target or a division line (a white line or the like) of a lane on a road can be extracted.

In this embodiment, the detection unit 32A is a light detection and ranging (LIDAR) (to be sometimes referred to as the lidar 32A hereinafter) configured to detect an object around the vehicle V by light, and detects a target around the vehicle V or measures the distance to a target. In this embodiment, five lidars 32A are provided; one at each corner of the front portion of the vehicle V, one at the center of the rear portion, and one on each side of the rear portion. The number of lidars 32A and their arrangement can appropriately be selected.

The ECU 29A is a traveling support unit configured to execute control associated with traveling support (in other words, driving support) as traveling control of the vehicle V based on the detection result of the detection unit 31A.

The ECU 22A is a steering control unit configured to control an electric power steering device 41A. The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, a sensor that detects the rotation amount of the motor, a torque sensor that detects the steering torque on the driver, and the like.

The ECU 23A is a braking control unit configured to control a hydraulic device 42A. A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. In this embodiment, the ECU 23A and the hydraulic device 42A form an electric servo brake. The ECU 23A controls, for example, the distribution of a braking force by the four brake devices 51 and a braking force by regenerative braking of the motor M.

The ECU 24A is a stop maintaining control unit configured to control an electric parking lock device 50a provided in the automatic transmission TM. The electric parking lock device 50a includes a mechanism that mainly locks the internal mechanism of the automatic transmission TM when the P range (parking range) is selected. The ECU 24A can control lock and unlock by the electric parking lock device 50a.

The ECU 25A is an in-vehicle notification control unit configured to control an information output device 43A that notifies information in the vehicle. The information output device 43A includes, for example, a display device such as a head-up display and a voice output device. The information output device 43A may further include a vibration device. The ECU 25A causes the information output device 43A to output, for example, various kinds of information such as a vehicle speed and an atmospheric temperature and information such as a path guidance.

The ECU 26A is an external notification control unit configured to control an information output device 44A that notifies information outside the vehicle. In this embodiment, the information output device 44A is a direction indicator (hazard lamp). The ECU 26A controls blinking of the information output device 44A serving as a direction indicator, thereby notifying the exterior of the vehicle of the advancing direction of the vehicle V. In addition, the ECU 26A controls blinking of the information output device 44A serving as a hazard lamp, thereby increasing the attention of the exterior to the vehicle V.

The ECU 27A is a driving control unit configured to control the power plant 50. In this embodiment, one ECU 27A is assigned to the power plant 50. However, one ECU may be assigned to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the traveling state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28b, and a communication device 28c and information processing of a detection result or a communication result. The gyro sensor 33A detects the rotary motion of the vehicle V. The route of the vehicle V can be determined based on the detection result of the gyro sensor 33A, and the like. The GPS sensor 28b detects the current position of the vehicle V. The communication device 28c performs wireless communication with a server configured to provide map information and traffic information, and acquires these pieces of information. A database 28a can store accurate map information. The ECU 28A can more accurately specify the position of the vehicle V on a lane based on the map information and the like.

An input device 45A is arranged in the vehicle such that the driver can operate it, and accepts input of an instruction or information from the driver.

<Control Apparatus 1B>

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the traveling environment of the vehicle V based on the detection results of detection units 31B and 32B that detect the peripheral situation of the vehicle V, and also serves as a traveling support unit configured to execute control associated with traveling support (in other words, driving support) as traveling control of the vehicle V. The ECU 21B generates target data (to be described later) as peripheral environment information.

Note that in this embodiment, the ECU 21B has the environment recognition function and the traveling support function. However, an ECU may be provided for each function, like the ECU 21A and the ECU 29A of the control apparatus 1A. Reversely, in the control apparatus 1A, the functions of the ECU 21A and the ECU 29A may be implemented be one ECU, like the ECU 21B.

In this embodiment, the detection unit 31B is an image capturing device (to be sometimes referred to as the camera 31B hereinafter) configured to detect an object around the vehicle V by image capturing. The camera 31B is attached to the windshield inside the vehicle cabin at the roof front of the vehicle V to capture the front side of the vehicle V. When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

The ECU 22B is a steering control unit configured to control the electric power steering device 41B. The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, a sensor that detects the rotation amount of the motor, a torque sensor that detects the steering torque on the driver, and the like. In addition, a steering angle sensor 37 is electrically connected to the ECU 22B via a communication line L2 to be described later, and the electric power steering device 41B can be controlled based on the detection result of the steering angle sensor 37. The ECU 22B can acquire the detection result of a sensor 36 that detects whether the driver is gripping the steering handle ST, and can monitor the gripping state of the driver.

The ECU 23B is a braking control unit configured to control a hydraulic device 42B. A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B.

In this embodiment, a wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and based on the detection results of these, an ABS function, traction control, and the posture control function for the vehicle V are implemented. For example, the ECU 23B adjusts the braking force of each wheel based on the detection result of the wheel speed sensor 38 provided in each of the four wheels, thereby suppressing skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external notification control unit configured to control an information output device 43B that notifies information outside the vehicle. In this embodiment, the information output device 43B is a brake lamp, and the ECU 23B can light the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can control lock and unlock of the rear wheels by the electric parking brake devices 52.

The ECU 25B is an in-vehicle notification control unit configured to control an information output device 44B that notifies information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle such that the driver can operate it, and accepts input of an instruction or information from the driver.

<Communication Lines>

An example of communication lines of the control system 1, which communicably connect the ECUs, will be described with reference to FIG. 3. The control system 1 includes communication lines L1 to L7 of wired communication. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECU 20A and the ECU 21B, and the communication line L4 connects the ECU 20A and the ECU 21A. The communication line L5 connects the ECU 20A, the ECU 21A, and the ECU 28A. The communication line L6 connects the ECU 29A and the ECU 21A. The communication line L7 connects the ECU 29A and the ECU 20A.

The protocols of the communication lines L1 to L7 may be identical or different, and may be changed in accordance with the communication environment such as a communication speed, a communication amount, and durability. For example, the communication lines L3 and L4 may be Ethernet® from the viewpoint of communication speed. For example, the communication lines L1, L2, and L5 to L7 may be CAN.

The control apparatus 1A includes a gateway GW. The gateway GW relays the communication line L1 and the communication line L2. For this reason, for example, the ECU 21B can output a control instruction to the ECU 27A via the communication line L2, the gateway GW, and the communication line L1.

<Power Supply>

The power supply of the control system 1 will be described with reference to FIG. 3. The control system 1 includes a large capacity battery 6, a power supply 7A, and a power supply 7B. The large capacity battery 6 is a battery used to drive the motor M and charged by the motor M.

The power supply 7A is a power supply that supplies power to the control apparatus 1A, and includes a power supply circuit 71A and a battery 72A. The power supply circuit 71A is a circuit that supplies the power of the large capacity battery 6 to the control apparatus 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the control apparatus 1A even in a case in which the power supply of the large capacity battery 6 or the power supply circuit 71A is shut down or lowers.

The power supply 7B is a power supply that supplies power to the control apparatus 1B, and includes a power supply circuit 71B and a battery 72B. The power supply circuit 71B is a circuit that is similar to the power supply circuit 71A and supplies the power of the large capacity battery 6 to the control apparatus 1B. The battery 72B is a battery similar to the battery 72A, and is a lead battery of, for example, 12 V. Since the battery 72B is provided, the power can be supplied to the control apparatus 1B even in a case in which the power supply of the large capacity battery 6 or the power supply circuit 71B is shut down or lowers.

<Redundancy>

Functions common to the control apparatus 1A and the control apparatus 1B will be described. When the same functions are made redundant, the reliability of the control system 1 can be improved. In addition, some redundant functions provide different functions, instead of multiplexing the same functions. This suppresses an increase in cost caused by the redundancy of functions.

[Actuator System]

Steering

The control apparatus 1A includes the electric power steering device 41A and the ECU 22A that controls this. The control apparatus 1B also includes the electric power steering device 41B and the ECU 22B that controls this.

Braking

The control apparatus 1A includes the hydraulic device 42A and the ECU 23A that controls this. The control apparatus 1B includes the hydraulic device 42B and the ECU 23B that controls this. All of these can be used for braking of the vehicle V. On the other hand, the main function of the braking mechanism of the control apparatus 1A is the distribution of the braking force by the brake device 51 and the braking force by the regenerative braking of the motor M. On the other hand, the main function of the braking mechanism of the control apparatus 1B is posture control and the like. Although the functions are common concerning braking, functions different from each other are provided.

Stop Maintaining

The control apparatus 1A includes the electric parking lock device 50a and the ECU 24A that controls this. The control apparatus 1B includes the electric parking brake device 52 and the ECU 24B that controls this. All of these can be used to maintain the stop of the vehicle V. On the other hand, although the electric parking lock device 50a is a device that functions when the P range of the automatic transmission TM is selected, the electric parking brake device 52 is a device that locks a rear wheel. Although the functions are common concerning stop maintaining of the vehicle V, functions different from each other are provided.

In-Vehicle Notification

The control apparatus 1A includes the information output device 43A and the ECU 25A that controls this. The control apparatus 1B includes the information output device 44B and the ECU 25B that controls this. All of these can be used to notify the driver of information. On the other hand, the information output device 43A is, for example, a head-up display, and the information output device 44B is a display device such as a measuring instrument. Although the functions are common concerning in-vehicle notification, display devices different from each other can be employed.

External Notification

The control apparatus 1A includes the information output device 44A and the ECU 26A that controls this. The control apparatus 1B includes the information output device 43B and the ECU 23B that controls this. All of these can be used to notify information outside the vehicle. On the other hand, the information output device 44A is a direction indicator (hazard lamp), and the information output device 43B is a brake lamp. Although the functions are common concerning external notification, functions different from each other are provided.

Different Points

The control apparatus 1A includes the ECU 27A that controls the power plant 50. However, the control apparatus 1B does not include a unique ECU that controls the power plant 50. In this embodiment, both the control apparatuses 1A and 1B can solely perform steering, braking, and stop maintaining. Hence, even if the control apparatus 1A or control apparatus 1B suffers performance degradation, power supply shutdown, or communication interruption, it is possible to decelerate and maintain the stop state while suppressing lane departure. Additionally, as described above, the ECU 21B can output a control instruction to the ECU 27A via the communication line L2, the gateway GW, and the communication line L1, and the ECU 21B can also control the power plant 50. Since the control apparatus 1B does not include a unique ECU that controls the power plant 50, an increase in cost can be suppressed. However, the control apparatus 1B may include a unique ECU.

[Sensor System]

Detection of Peripheral Situation

The control apparatus 1A includes the detection units 31A and 32A. The control apparatus 1B includes the detection units 31B and 32B. All of these can be used to recognize the traveling environment of the vehicle V. On the other hand, the detection unit 32A is a lidar, and the detection unit 32B is a radar. The lidar is generally advantageous in detecting a shape. Additionally, the radar is generally more advantageous than the lidar from the viewpoint of cost. When these sensors of different characteristics are used, it is possible to improve target recognition performance and reduce the cost. Both the detection units 31A and 31B are cameras. Cameras of different characteristics may be used. For example, one of them may be a camera of a resolution higher than the other. In addition, the angles of view may be different from each other.

As for comparison of the control apparatus 1A and the control apparatus 1B, the detection characteristics of the detection units 31A and 32A may be different from those of the detection units 31B and 32B. In this embodiment, the detection unit 32A is a lidar whose target edge detection performance is higher than that of the radar (detection unit 32B) in general. Additionally, the radar is generally excellent in the relative speed detection accuracy or weatherability as compared to the lidar.

In addition, if the camera 31A has a resolution higher than that of the camera 31B, the detection performance of the detection units 31A and 32A is higher than that of the detection units 31B and 32B. When the plurality of sensors of different detection characteristics and costs are combined, cost advantage can sometimes be obtained in the whole system. In addition, when the sensors of different detection characteristics are combined, detection omission or detection errors can be reduced as compared to a case in which redundancy is attained by identical sensors.

Vehicle Speed

The control apparatus 1A includes the rotation speed sensor 39. The control apparatus 1B includes the wheel speed sensor 38. Both can be used to detect the vehicle speed. On the other hand, the rotation speed sensor 39 detects the rotation speed of the output shaft of the automatic transmission TM, and the wheel speed sensor 38 detects the rotation speed of the wheels. Although the sensors are common concerning the capability of detecting the vehicle speed, the detection targets are different from each other.

Yaw Rate

The control apparatus 1A includes the gyro sensor 33A. The control apparatus 1B includes the yaw rate sensor 33B. Both can be used to detect the angular velocity about the vertical axis of the vehicle V. On the other hand, the gyro sensor 33A is used to determine the route of the vehicle V, and the yaw rate sensor 33B is used for posture control of the vehicle V, and the like. Although the sensors are common concerning the capability of detecting the angular velocity of the vehicle V, the use purposes are different from each other.

Steering Angle and Steering Torque

The control apparatus 1A includes a sensor that detects the rotation amount of the motor of the electric power steering device 41A. The control apparatus 1B includes the steering angle sensor 37. Both can be used to detect the steering angle of the front wheels. In the control apparatus 1A, an increase in cost can be suppressed by using the sensor that detects the rotation amount of the motor of the electric power steering device 41A, instead of additionally providing the steering angle sensor 37. However, the steering angle sensor 37 may additionally be provided in the control apparatus 1A.

In addition, when both the electric power steering devices 41A and 41B include torque sensors, the steering torque can be recognized in both the control apparatuses 1A and 1B.

Braking Operation Amount

The control apparatus 1A includes the operation detection sensor 34$b$. The control apparatus 1B includes the pressure sensor 35. Both can be used to detect the braking operation amount of the driver. On the other hand, the operation detection sensor 34$b$ is used to control the distribution of the braking force by the four brake devices 51 and the braking force by regenerative braking of the motor M, and the pressure sensor 35 is used for posture control and the like. Although the sensors are common concerning detection of the braking operation amount, the use purposes are different from each other.

[Power Supply]

The control apparatus 1A receives power supply from the power supply 7A, and the control apparatus 1B receives power supply from the power supply 7B. Since the power is supplied to any one of the control apparatuses 1A and 1B even in a case in which the power supply of one of the power supply 7A and the power supply 7B is shut down or lowers, it is possible to more reliably ensure the power supply and improve the reliability of the control system 1. If the power supply of the power supply 7A is shut down or lowers, it is difficult to perform communication between the ECUs via the gateway GW provided in the control apparatus 1A. However, in the control apparatus 1B, the ECU 21B can communicate with the ECUs 22B to 24B via the communication line L2.

[Redundancy in Control Apparatus 1A]

The control apparatus 1A includes the ECU 20A that performs automated driving control, and the ECU 29A that performs traveling support control. That is, the control apparatus 1A includes two control units configured to perform traveling control.

<Examples of Control Functions>

Control functions executable by the control apparatus 1A or 1B include traveling-associated functions associated with control of driving, braking, and steering of the vehicle V, and notification functions associated with a notification of information to the driver.

Examples of traveling-associated functions are lane maintaining control, lane departure suppression control (lane deviation suppression control), lane change control, preceding vehicle follow control, collision reduction brake control, and erroneous start suppression control. Examples of the notification functions are adjacent vehicle notification control and preceding vehicle start notification control.

Lane maintaining control is one of control processes for the position of the vehicle with respect to a lane. This control makes the vehicle travel automatically (without depending on the driving operation of the driver) on a traveling track set in a lane. Lane departure suppression control is one of control processes for the position of the vehicle with respect to a lane. A white line or a median strip is detected, and steering is automatically performed so the vehicle does not pass across the line. As described above, lane departure suppression control and lane maintaining control are different functions.

Lane change control is control of automatically moving the vehicle from the lane on which the vehicle is traveling to an adjacent lane. Preceding vehicle follow control is control of automatically following another vehicle traveling ahead of the self-vehicle. Collision reduction brake control is control of automatically braking the vehicle and supporting collision avoidance in a case in which the possibility of collision against an obstacle ahead of the vehicle rises. Erroneous start suppression control is control of limiting acceleration of the vehicle in a vehicle stop state in a case in which the acceleration operation by the driver is a predetermined amount or more, and suppresses abrupt start.

Adjacent vehicle notification control is control of notifying the driver of the presence of another vehicle traveling on the adjacent lane adjacent to the traveling lane of the self-vehicle. The driver is notified of, for example, the presence of another vehicle traveling on a side or on a rear side of the self-vehicle. Preceding vehicle start notification control is control of notifying that the self-vehicle and another vehicle ahead are in a stop state, and another vehicle ahead has started. These notifications can be made by the above-described in-vehicle notification devices (the information output device 43A and the information output device 44B).

The ECU 20A, the ECU 29A, and the ECU 21B can share and execute these functions. Which control function is to be assigned to which ECU can appropriately be selected.

<Steering Control>

Figure 4:
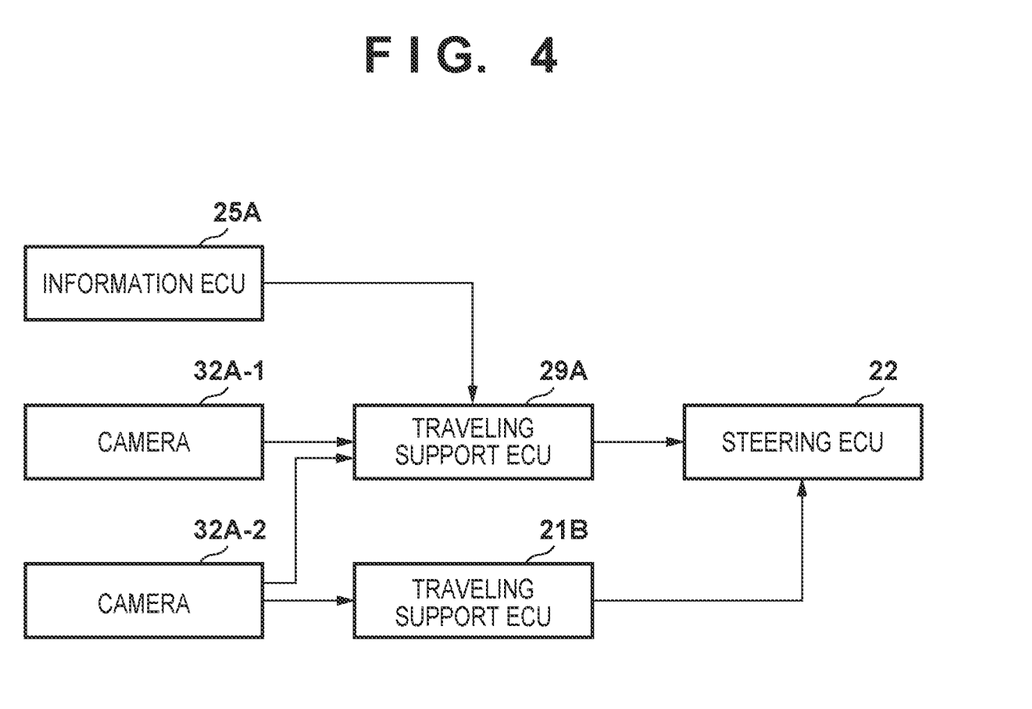
FIG. 4 is a view for explaining switching of a camera according to the embodiment.

FIG. 4 is a view for explaining the concept of steering control according to this embodiment. The same reference numerals as in FIGS. 1 and 2 denote the similar constituent elements. As described above, in the vehicle V according to this embodiment, two cameras 32A (cameras 32A-1 and 32A-2) are installed to acquire peripheral information on the front side. The installation positions of the cameras 32A-1 and 32A-2 are different. For this reason, even if they acquire peripheral information (images) at the same timing, a difference is generated in the peripheral information. Two cameras 32A installed in the width direction of the vehicle like the cameras 32A shown in FIG. 1 will be described here as an example. However, the present invention is not limited to this, and a combination of a plurality of cameras (for example, the cameras 32A and the cameras 31) provided in the height direction may be used. These cameras can acquire peripheral information (images) in the same direction. In other words, the image capturing ranges of the two cameras 32A at least partially overlap.

The traveling support ECU 29A is an ECU of the active system and is used when normal traveling support is performed. The traveling support ECU 29A acquires information (for example, a high-definition map) from the information ECU 25A. As the information here, for example, the position or shape (the vehicle width, the bending state, or the like) of a white line on a road, or the like is used.

The traveling support ECU 21B is an ECU of the redundant system. If, for example, a certain failure has occurred in the control of the traveling support ECU 29A, the traveling support ECU 21B performs control in place of the traveling support ECU 29A. Information (image) acquired by the camera 32A-1 and information (image) acquired by the camera 32A-2 are input to the traveling support ECU 29A. Information (image) acquired by the camera 32A-2 is input to the traveling support ECU 21B.

Control signals of the traveling support ECU 29A and the traveling support ECU 21B are input to the steering ECUs 22. Normally, the signal from the traveling support ECU 29A is used in the steering ECUs 22. At the time of a failure or the like in the traveling support ECU 29A, the signal for the traveling support ECU 21B is used.

In this embodiment, the traveling support ECU 29A and the traveling support ECU 21B can issue an instruction concerning steering angle control to the steering ECU 22. The processing contents when issuing the instruction are different. For example, the traveling support ECU 29A performs processing using map information and traveling contents (history information) so far, and outputs an instruction concerning the steering angle to the steering ECUs 22. Additionally, in a normal state, the traveling support ECU 29A performs steering angle control using information (image) from the camera 32A-1 and does not use information (image) from the camera 32A-2 for the steering angle control. On the other hand, the traveling support ECU 21B performs steering angle control based on information (image) from the camera 32A-2, but does not use, for example, map information or history information before a predetermined time.

Note that as for each control, the present invention is not limited to use of the above-described information, and another arrangement may be used. In this embodiment, the steering angle ECU 22 can identify which traveling support ECU has issued the instruction.

Figure 5:
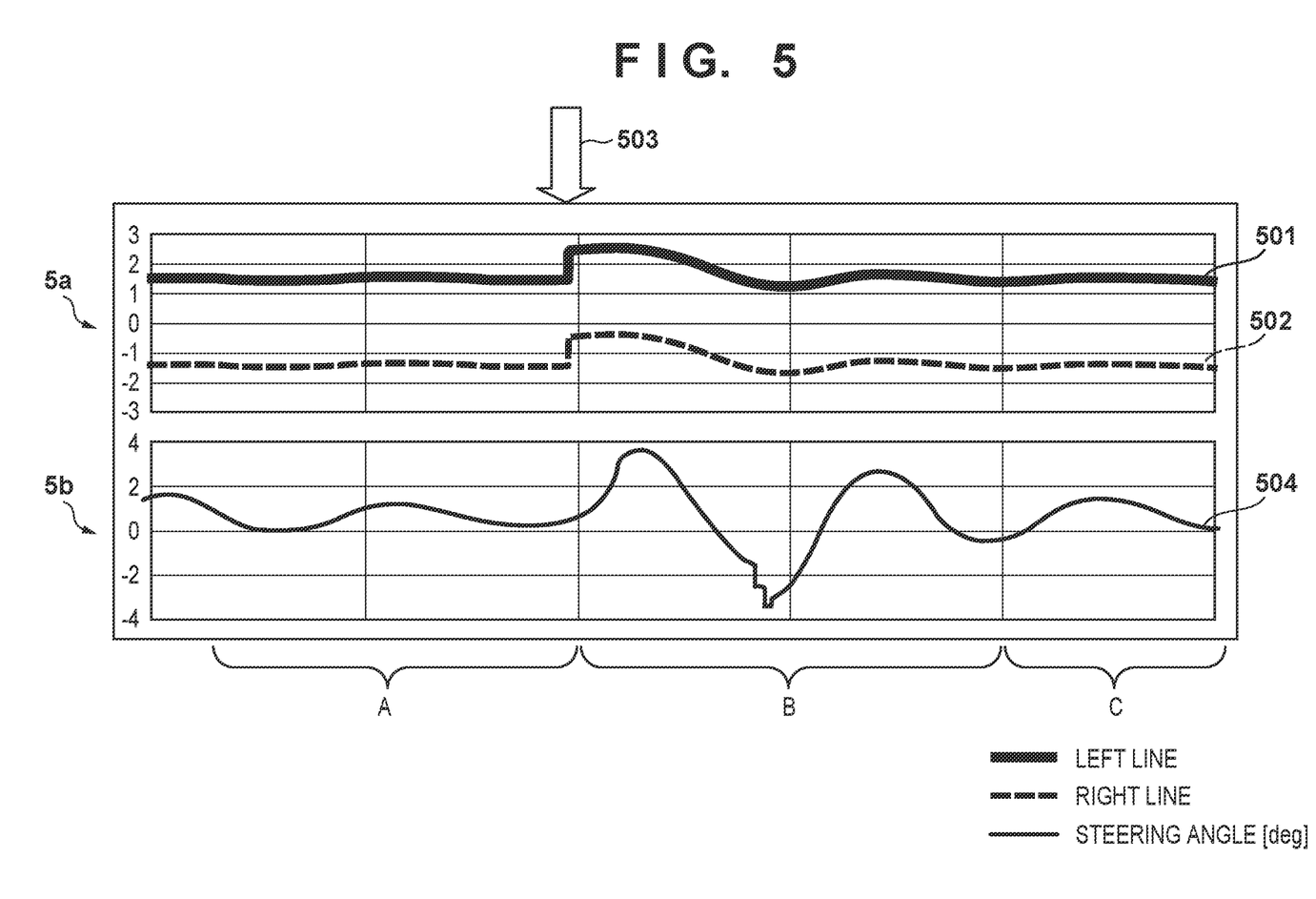
FIG. 5 is a view for explaining switching of a camera according to the embodiment.

FIG. 5 is a view for explaining variations in a white line recognition state at the time of switching of the camera and steering angle control in traveling-associated functions. Lane maintaining control will be described here as an example. In FIG. 5, 5a shows the positions of white lines extracted based on images acquired by the cameras. The position of the white line here is, for example, the position of the white line several tens meters ahead of the self-vehicle. Hence, a position apart from the self-vehicle by a predetermined distance may be used as the detection position of the white line. The ordinate represents an input value [m] concerning the white line, and the abscissa represents time [s]. On the ordinate, "0" indicates the center position of the self-vehicle. As the difference (relative position) from the center position, a white line position on the left side is indicated as plus (+), and a white line position on the right side is indicated as minus (−). Hence, a graph 501 represents input values corresponding to the white line on the left side of the vehicle, and a graph 502 represents input values corresponding to the white line on the right side of the vehicle.

Note that the input value here has been described as a relative value with respect to the center of the vehicle. However, the present invention is not limited to this. For example, the input value may be the difference from the center position of a camera. In this case, the input value is corrected based on the difference between the installation position of the camera and the center position of the vehicle.

In 5a of FIG. 5, in a range A, lane maintaining control is performed using the camera 32A-1 of the active system.

After that, switching to the camera 32A-2 of the redundant system is performed at a timing indicated by an arrow 503. In this case, since the installation positions of the cameras are different, as described above, the detection result changes in the same white line. In addition, the cameras have individual differences (dispersions). Because of such differences, a shift occurs in the input value representing the white line immediately after the switching. Here, a shift of about 1 m occurs in the leftward direction.

In FIG. 5, 5b shows the control amount of the steering angle in steering angle control of the vehicle. The ordinate represents the control amount [deg] of steering angle control, and the abscissa represents time. If it is detected that the position of the white line shifts leftward, as shown in 5a of FIG. 5, steering is controlled leftward, as indicated by a graph 504 in 5b of FIG. 5. Then, steering in the leftward and rightward directions is repeated to cope with the image after switching, thereby stabilizing traveling. Additionally, the steering ECU performs correction of the input values according to the installation positions of the cameras in accordance with the switching of the camera. With these control operations, control corresponding to the camera after the switching is performed. As a result, the traveling position before the switching of the camera (range A) and the traveling position after the switching of the camera (range B) become equal, and stable traveling (lane maintaining) is continued. At this time, in the range B, the control amount of the steering becomes large in accordance with the switching of the camera. After stabilizing, the control amount of steering becomes the same as in the range A, as indicated by a range C.

Here, when the switching of the camera as indicated by the arrow 503 has occurred, if the state is abruptly brought close to the state before switching, the traveling behavior of the vehicle V becomes unstable. For example, if the control amount of steering is abruptly increased in accordance with the switching, the acceleration in the lateral direction during traveling increases, resulting in an influence on the comfort of ride of an occupant, traveling stability, and the like.

In this embodiment, during a predetermined period immediately after the occurrence of the switching of the camera, limitations are added to the control amount concerning traveling support. Note that in this embodiment, a predetermined limitation is added to the control amount even in the range A or the range C shown in FIG. 5. A limitation higher than this limitation is added in the range B.

<Control Procedure>

Figure 6:
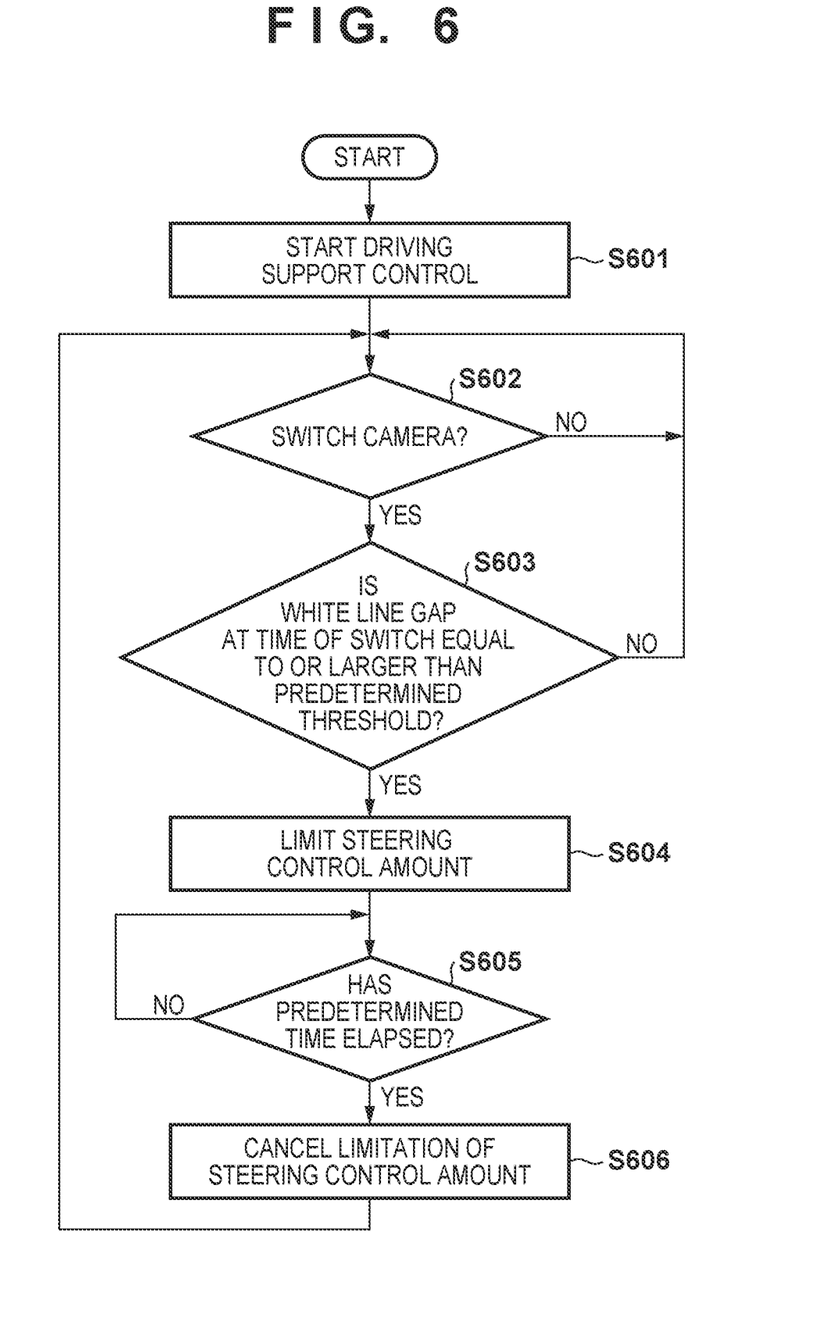
FIG. 6 is a flowchart of processing at the time of switching of a camera according to the embodiment.

FIG. 6 is a flowchart showing a control procedure according to this embodiment. This processing procedure is started when, for example, a driving support instruction is made by the driver of the vehicle V, or the vehicle is switched to a mode to perform driving support. In each control, various kinds of ECUs and the like as described above, which are provided in the vehicle, cooperatively perform processing. Here, for the descriptive simplicity, the processing entity is shown as the control system 1 of the vehicle V.

In step S601, the control system 1 starts driving support control of the vehicle V. The driving support control here includes the above-described traveling-associated functions. In addition, as peripheral information used for driving support control, white line information based on peripheral information acquired from the camera 32A is used.

In step S602, the control system 1 determines whether switching of the camera is performed. That is, the control system 1 determines whether peripheral information used in driving support control is changed from information acquired by the camera 32A-1 to peripheral information acquired by the camera 32A-2 that is the redundant system. This switching is done in a case in which, for example, a failure has occurred in the camera 32A-1 or the traveling support ECU 29A. In the arrangement shown in FIG. 4, if switching to the camera 32A-2 is done, the traveling support ECU 21B that is the redundant system is used. Upon determining that the switching of the camera is performed (YES in step S602), the process advances to step S603. Upon determining that the switching is not performed (NO in step S602), driving support control is continued, and monitoring concerning switching of the camera is continued.

In step S603, the control system 1 determines, in accordance with the switching of the camera, whether the difference (white line gap) between the position of a white line detected before the switching and the position of the white line detected after the switching is equal to or larger than a predetermined threshold. The predetermined threshold here is defined in advance and stored in a storage unit. In addition, the predetermined threshold to be used may be decided based on the installation position of each camera or the traveling state (the speed, the traveling position, or the like) of the vehicle. Upon determining that the difference is equal to or larger than the predetermined threshold (YES in step S603), the process advances to step S604. Upon determining that the difference is smaller than the predetermined threshold (NO in step S603), the process returns to step S602 to continue driving support control without limiting the steering control amount. Note that in a case in which the system has already learned the white line gap (left/right difference) generated by switching of the camera, driving support control may be continued without limiting the steering control amount.

In step S604, the control system 1 limits the control amount of steering control. That is, if the control amount controllable by normal driving support control is directly permitted immediately after the switching of the camera, the traveling behavior of the vehicle V becomes unstable. To prevent this, the control amount of steering control is limited. The control amount limited here may be decided based on, for example, the difference between the installation positions of the cameras 32A or the difference of acquirable images. Alternatively, the control amount may be decided based on the traveling speed of the vehicle V, the state of the road to travel, the presence/absence of a vehicle on the periphery, or the like. In addition, the control amount of steering may be limited on the side of the traveling support ECU 21B or on the side of the steering ECU 22.

In step S605, the control system 1 determines whether a predetermined time has elapsed after the steering control amount is limited. As the predetermined time here, for example, a specific value set in advance may be used, or the value may be decided from the traveling speed of the vehicle V. If the predetermined time has elapsed (YES in step S605), the process advances to step S606. If the predetermined time has not elapsed (NO in step S605), monitoring is continued until the time elapses.

In step S606, the control system 1 cancels the limitation of the steering control amount performed in step S604. Then, the process returns to step S602 to continue driving support control.

This processing procedure ends when, for example, a driving support cancel instruction is made by the driver of the vehicle V, or the vehicle is switched to a mode not to perform driving support. In this embodiment, the limitation of the steering control amount is canceled after the predetermined time has elapsed from the limitation. However, the present invention is not limited to this. For example, the limitation may be canceled when the control amount of steering becomes equal to that in the range A before the switching, as indicated by the range C in FIG. 5. Alternatively, the limitation may be canceled after the vehicle V has traveled a predetermined distance after the limitation.

<Limitation of Steering Control Amount>

The limitation of the steering control amount according to this embodiment will be described. In the limitation method according to this embodiment, the change amount with respect to the preceding steering control amount (the instruction value of the steering angle) is limited. For example, the period of steering angle instruction is set to 10 [ms]. The preceding steering angle control amount is assumed to be 10 [deg]. In this case, the upper limit of the control amount of the steering angular velocity is set to 30 [deg/s]. As a result, the current steering angle control amount is limited to the range of 9.7 to 10.3 [deg] (10±0.3 [deg]). Note that the period of steering angle instruction is an example, and is not limited to this. In addition, the steering angular velocity to be limited may be changed in accordance with the traveling speed of the vehicle V or the like.

Figure 7:
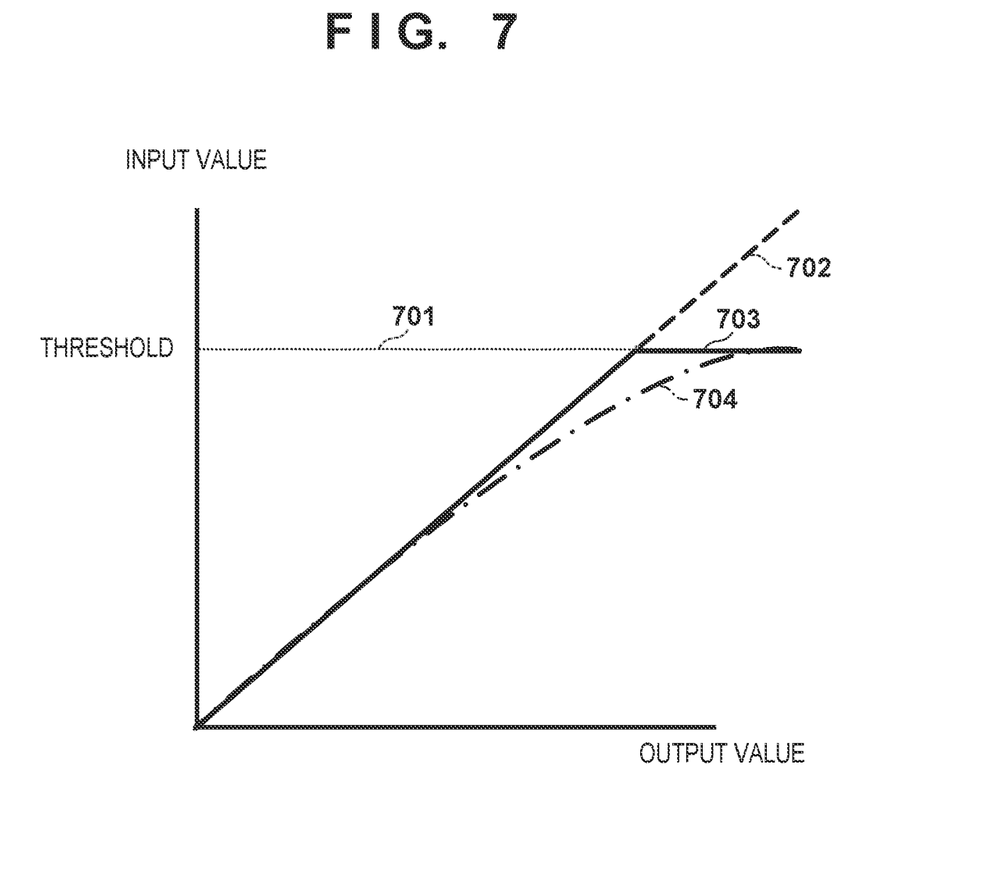
FIG. 7 is a view for explaining an example of a steering control amount limitation method according to the embodiment.

FIG. 7 shows an example of the steering angle control amount limitation method. In FIG. 7, the ordinate represents an input value input as a steering angle instruction value, and the abscissa represents an output value as a control amount to control the vehicle V. As one example, the input value to the traveling support ECU 21B and the output value will be described here. However, the steering ECU 22 may perform the processing.

A line 701 represents a threshold used when adding a limitation. A line 702 represents the relationship between the input value and the output value in a case in which no limitation is added. In this case, the input value is directly used as the output value. Each of lines 703 and 704 represents the relationship between the input value and the output value in a case in which a limitation is added. The line 703 indicates a case in which a limitation is added to a portion where the input value exceeds the threshold such that the output value becomes equal (or almost equal) to the threshold. The line 704 indicates a case in which the input value is corrected and reduced within the entire range of the input value such that the value becomes equal to or smaller than the threshold. When performing control represented by the line 704, the output value can be decided using, for example, a conversion table or the like. Additionally, although not illustrated in FIG. 7, when adding a limitation, if the input value is smaller than a predetermined value, the input value may directly be used as the output value. If the input value is larger than the predetermined value, the control amount may be suppressed by performing correction represented by the line 703.

An arrangement that limits the change amount of the steering angular velocity between the preceding control and the current control has been described above. However, the present invention is not limited to this. For example, a threshold may be set for the instruction value of the steering angle, and the steering angle control amount may be limited based on the threshold. In addition, a setting may be done to lower the amount to be limited stepwise along with the elapse of time from the start of the limitation.

In the above embodiment, two cameras have been described as an example. However, the present invention is not limited to this. For example, the same processing as described above can be applied even in a case in which switching occurs among three or more cameras.

Additionally, in the above embodiment, a camera has been described as an example of the means for acquiring peripheral information. However, the present invention is not limited to this. For example, the present invention may be applied in a case in which switching of another detection means such as a sensor or a lidar configured to acquire peripheral information to be used for driving support control occurs.

As described above, according to this embodiment, it is possible to stabilize the behavior of the vehicle even if the camera configured to acquire peripheral information used in driving support control is switched when driving support control is performed. In addition, when the behavior of the vehicle stabilizes, the uneasiness of the occupant of the vehicle can be eliminated.

Summary of Embodiment

1. A vehicle control system (for example, 1) according to the above embodiment is
a vehicle control system provided with first detection unit and second detection unit (for example, 32A) configured to acquire peripheral information of a self-vehicle (for example, V), comprising:
a control unit (for example, 29A, 21B, 22) configured to perform traveling control of the self-vehicle using the peripheral information,
wherein when switching from a first traveling state using peripheral information detected by the first detection unit to a second traveling state using peripheral information detected by the second detection unit is performed, the control unit suppresses a control amount based on the peripheral information of the self-vehicle.

According to this embodiment, it is possible to stabilize the behavior of the vehicle even if the detection unit for acquiring peripheral information used in driving support control is switched.

2. In the above embodiment, the first detection unit and the second detection unit comprise a first camera and a second camera, whose image capturing ranges at least partially overlap, and
the first camera and the second camera are provided at different positions in a width direction of the self-vehicle.

According to this embodiment, it is possible to stabilize the behavior of the vehicle even if the camera is switched when the acquired peripheral information is different depending on the installation position of the camera.

3. In the above embodiment, a first threshold for the control amount based on the peripheral information used in one of the first traveling state and the second traveling state is larger than a second threshold for the control amount based on the peripheral information used in a predetermined period after switching from the first traveling state to the second traveling state.

According to this embodiment, the control amount can be switched in accordance with the traveling state, and the stability of the vehicle in traveling control can be improved.

4. In the above embodiment, the predetermined period is one of a period until a predetermined time elapses after switching from the first traveling state to the second traveling state and a period until the self-vehicle travels a predetermined distance after switching from the first traveling state to the second traveling state.

According to this embodiment, the stability of the vehicle in traveling control can be improved by controlling the period of adding a limitation starting from the switching of the detection unit.

5. In the above embodiment, the control amount is a control amount concerning steering.

According to this embodiment, it is possible to stabilize the behavior of the vehicle concerning steering even if the detection unit configured to acquire the peripheral information used in driving support control is switched.

6. In the above embodiment, the peripheral information is a position of a white line on a road on which the self-vehicle travels.

According to this embodiment, it is possible to stabilize control based on the white line even if the detection unit configured to acquire the peripheral information used in driving support control is switched.

7. A control method of a vehicle according to the above embodiment is a control method of a vehicle (for example, V) provided with first detection unit and second detection unit (for example, 32A) configured to acquire peripheral information of a self-vehicle, comprising:

performing traveling control by suppressing a control amount based on the peripheral information of the self-vehicle when switching from a first traveling state using peripheral information detected by the first detection unit to a second traveling state using peripheral information detected by the second detection unit is performed.

In this embodiment, it is possible to stabilize the behavior of the vehicle even if the detection unit configured to acquire peripheral information used in driving support control is switched.

The present invention is not limited to the above embodiments, and various changes and modifications can be made within the spirit and scope of the present invention.

What is claimed is:

1. A vehicle control system provided with a first detection unit and a second detection unit, which are configured to acquire peripheral information of a self-vehicle, comprising:
a controller including at least one processor and at least one storage device and configured to perform traveling control of the self-vehicle using the peripheral information,
wherein after switching from a first traveling state in which the first detection unit is used for acquiring the peripheral information and the second detection unit is not used for acquiring the peripheral information to a second traveling state in which the second detection unit is used for acquiring the peripheral information and the first detection unit is not used for acquiring the peripheral information, the controller is configured to suppress a control amount in the second traveling state based on a detection of an object which is detected by the second detection unit and was detected by the first detection unit in the first traveling state.

2. The system according to claim 1, wherein
the first detection unit and the second detection unit comprise a first camera and a second camera, whose image capturing ranges at least partially overlap, and the first camera and the second camera are provided at different positions in a width direction of the self-vehicle.

3. The system according to claim 2, wherein the object is a line marked on a road,
in the first traveling state, the controller is configured to perform a lane maintaining control of the self-vehicle based on the line detected by the first detection unit,
in the second traveling state, the controller is configured to perform the lane maintaining control of the self-vehicle based on the line detected by the second detection unit,
the control amount is a control amount concerning steering in the lane maintaining control of the self-vehicle,
after switching from the first traveling state to the second traveling state, the controller is configured to determine whether a difference between a position of the line detected by the first detection unit before the switching and a position of the line detected by the second detection unit after the switching is not smaller than a predetermined threshold, and
the controller is configured to suppress the control amount when the controller determines that the difference is not smaller than the predetermined threshold.

4. The system according to claim 1, wherein after switching from the first traveling state to the second traveling state, the controller suppresses the control amount in a predetermined time.

5. The system according to claim 1, wherein after switching from the first traveling stated to the second traveling state, the controller suppresses the control amount until the self-vehicle travels a predetermined distance.

6. The system according to claim 1, wherein the peripheral information includes a position of a white line on a road on which the self-vehicle travels.

7. A control method of a vehicle provided with a first detection unit and a second detection unit, which are configured to acquire peripheral information of a self-vehicle, comprising:
switching a traveling state of the self-vehicle from a first traveling state in which the first detection unit is used for acquiring the peripheral information and the second detection unit is not used for acquiring the peripheral information to a second traveling state in which the second detection unit is used for acquiring the peripheral information and the first detection unit is not used for acquiring the peripheral information; and
performing traveling control by suppressing a control amount in the second traveling state based on a detection of an object which is detected by the second detection unit and was detected by the first detection unit in the first traveling state.

* * * * *